(No Model.)
O. P. BROWN & W. S. DEIDRICH.
Marking Attachment for Plow.
No. 230,231.      Patented July 20, 1880.
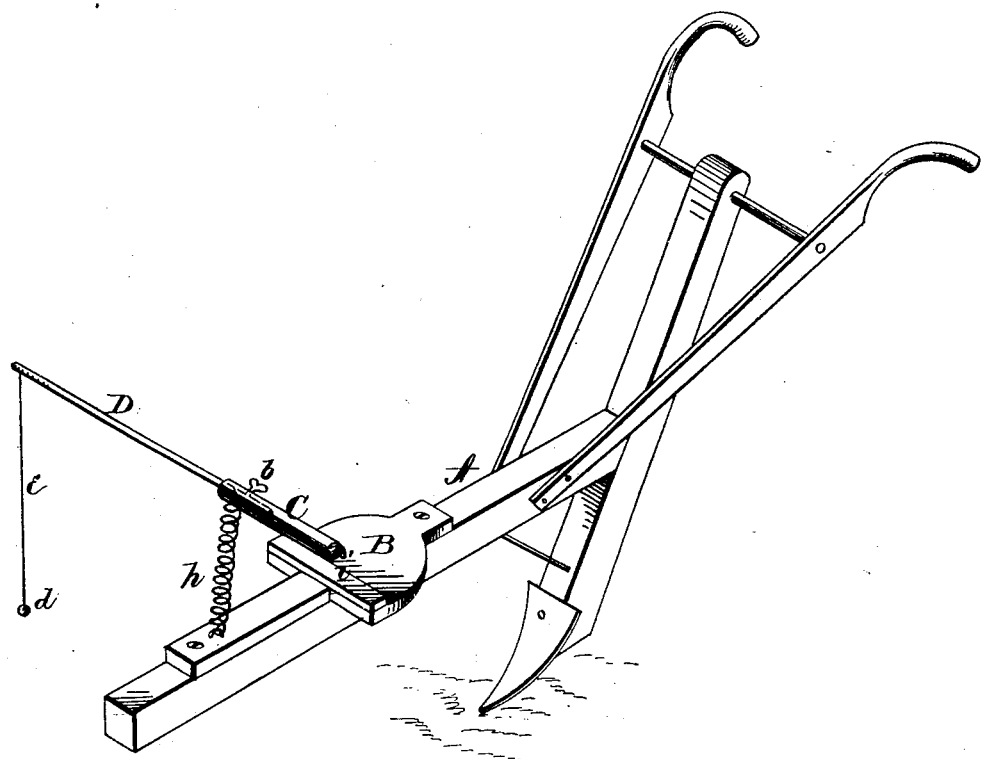
Witnesses:
A. L. Durand
J. J. McCarthy
Inventor:
Owen P. Brown
William S. Deidrich
By Alexander Mason
atty

UNITED STATES PATENT OFFICE.

OWEN P. BROWN AND WILLIAM S. DEIDRICH, OF SMITHVILLE, GEORGIA.

MARKING ATTACHMENT FOR PLOWS.

SPECIFICATION forming part of Letters Patent No. 230,231, dated July 20, 1880.

Application filed April 13, 1880. (No model.)

*To all whom it may concern:*

Be it known that we, OWEN P. BROWN and WILLIAM S. DEIDRICH, of Smithville, in the county of Lee, and in the State of Georgia, have invented certain new and useful Improvements in Marking Attachments for Plows; and we do hereby declare that the following is a full, clear, and exact description thereof, reference being had to the accompanying drawings, and to the letters of reference marked thereon, making a part of this specification.

The nature of our invention consists in the construction and arrangement of a row-gage for plows, as will be hereinafter more fully set forth.

In order to enable others skilled in the art to which our invention appertains to make and use the same, we will now proceed to describe its construction and operation, referring to the annexed drawings, which represents a perspective view of a plow with our row-gage attached thereto.

A represents the beam of a plow of any construction. On top of the beam A is fastened the base B of the row-gage, on which is swiveled a socket or holder, C, having a rod, D, inserted in its end. This rod may be adjusted out or in, as required, and is fastened by a set-screw, $b$. At the outer end of the rod D is attached a cord, $e$, with a weight, $d$, at its end.

$h$ is a spiral or rubber spring connecting the holder C with the base B, to hold the holder against a stop, $i$, at right angles to the plow-beam.

After the first furrow or row has been laid off, the weight $d$ is to follow centrally in said row, giving the desired and uniform distance between the furrows or rows according to the length of the rod D. At the end of each row, and after the plowman has turned his horse and plow around, the socket and rod will be reversed, following back in the last-named row.

The spring $h$ enables the machine to pass trees and stumps without any interference with the machine, plowman, or stock. When the rod strikes a tree or stump the plow can go ahead until far enough for the rod to pass, and then the spring will bring it up to its proper place.

We are aware that land-markers have been made reversible, so as to be used on either side of a plow-beam, and also that weed-turners have been made yielding and held in place by means of springs, and hence we do not claim such, broadly, as our invention.

Having thus fully described our invention, what we claim as new, and desire to secure by Letters Patent, is—

The combination of the base B with stop $i$, swiveled holder C, rod D, with weight $d$ suspended from it, and the spring $h$, the whole adapted to be used on a plow, and the marker reversible from side to side, and also capable of yielding to obstructions and automatically returned to position, substantially as and for the purposes herein set forth.

In testimony that we claim the foregoing we have hereunto set our hands, this 29th day of March, 1880.

OWEN P. BROWN.
WILLIAM S. DEIDRICH.

Witnesses:
W. N. L. CROCKER,
J. J. McCARTHY.